United States Patent
Jiang et al.

(10) Patent No.: US 12,381,695 B2
(45) Date of Patent: Aug. 5, 2025

(54) METHOD AND DEVICE FOR CONFIGURING COMMUNICATION CHANNEL USING SIDELINK IN WIRELESS COMMUNICATION BETWEEN NODES

(71) Applicant: BUNKER HILL TECHNOLOGIES LLC, Allen, TX (US)

(72) Inventors: Qi Jiang, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 550 days.

(21) Appl. No.: 17/732,534

(22) Filed: Apr. 29, 2022

(65) Prior Publication Data

US 2022/0263639 A1 Aug. 18, 2022

Related U.S. Application Data

(63) Continuation of application No. PCT/CN2020/121094, filed on Oct. 15, 2020.

(30) Foreign Application Priority Data

Nov. 8, 2019 (CN) .......................... 201911089595.1

(51) Int. Cl.
*H04L 5/00* (2006.01)
*H04W 72/02* (2009.01)
(Continued)

(52) U.S. Cl.
CPC ............ *H04L 5/0092* (2013.01); *H04W 72/02* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| 12,137,471 B2 * | 11/2024 | Zhang | H04W 72/23 |
| 2016/0007383 A1 * | 1/2016 | Chae | H04W 76/50 |
|  |  |  | 455/404.1 |

(Continued)

FOREIGN PATENT DOCUMENTS

| CN | 101820682 A | 9/2010 |
| CN | 109121197 A | 1/2019 |

(Continued)

OTHER PUBLICATIONS

ISR received in application No. PCT/CN2020/121094 dated Jan. 15, 2021.

(Continued)

*Primary Examiner* — Gerald A Smarth
(74) *Attorney, Agent, or Firm* — Ascenda Law Group, PC

(57) ABSTRACT

The present disclosure provides a method and device in nodes used for wireless communications. A first node first receives a first signaling, and then receives a second signaling in a first time-frequency resource set; the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling. The present disclosure optimizes the configuration method of feedback channel on sidelink to improve the efficiency of spectrum on sidelink and the overall performance of the system.

12 Claims, 5 Drawing Sheets

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2016/0066337 A1 | 3/2016 | Sartori | |
| 2019/0174530 A1* | 6/2019 | Kim | H04W 72/12 |
| 2019/0274032 A1 | 9/2019 | Chatterjee | |

FOREIGN PATENT DOCUMENTS

| | | |
|---|---|---|
| CN | 109245869 A | 1/2019 |
| CN | 109391346 A | 2/2019 |
| CN | 109565853 A | 4/2019 |
| CN | 109792594 A | 5/2019 |
| CN | 110248411 A | 9/2019 |
| CN | 110266450 A | 9/2019 |
| CN | 110311762 A | 10/2019 |
| EP | 4057549 A1 * | 9/2022 ........... H04L 1/1812 |

OTHER PUBLICATIONS

First Office Action of Chinses patent application No. CN201911089595.1 dated Oct. 22, 2021.
Second Office Action of Chinses patent application No. CN201911089595.1 dated Feb. 25, 2022.
First Search Report of Chinses patent application No. CN201911089595.1 dated Oct. 11, 2021.
Notification to Grant Patent Right for Invention of Chinses patent application No. CN201911089595.1 dated Jul. 18, 2022.
NEC Physical layer structure for NR sidelink 3GPP TSG RAN WG1 #98bis R1-1911026 Oct. 20, 2019.
Xuetian Zhu "5G V2X network technology and standards development" Aug. 6, 2019.

* cited by examiner

METHOD AND DEVICE FOR CONFIGURING COMMUNICATION CHANNEL USING SIDELINK IN WIRELESS COMMUNICATION BETWEEN NODES

CROSS REFERENCE TO RELATED APPLICATIONS

This application is a continuation of International patent application no. PCT/CN2020/121094, filed on Oct. 15, 2020, which claims the priority benefit of Chinese Patent Application 201911089595.1, filed on Nov. 8, 2019, the full disclosure of which is incorporated herein by reference.

BACKGROUND

Technical Field

The present disclosure relates to transmission methods and devices in wireless communication systems, and in particular to a transmission method and device related to sidelink in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP defines 4 major Use Case Groups, covering Vehicles Platooning, Extended Sensors, Advanced Driving and Remote Driving. At 3GPP RAN #80 plenary, NR-based V2X technology research has been started, and based on the current discussion, a plurality of transmission types including broadcast, groupcast and unicast are supported on sidelink.

SUMMARY

Compared with the existing Long-term Evolution (LTE) V2X system, a significant feature of NR V2X is that it supports unicast and groupcast and supports Hybrid Automatic Repeat reQuest (HARQ) function. A Physical Sidelink Feedback Channel (PSFCH) channel is introduced for HARQ-Acknowledgement (HARQ-ACK) transmission on sidelink. In the current NR-based V2X of Rel-16 release, the mainstream view on the PSFCH is that the PSFCH is generated through sequence and carries a maximum number of 2 information bits to reduce the design complexity of the PSFCH. In V2X of future Rel-17 release, the PSFCH will carry more information bits, and configuration and design scheme of the corresponding PSFCH need to be reconsidered.

To address the above problem, the present disclosure provides a solution. It should be noted that in the description of the above problems, V2X is only illustrated as an example of an application scenario of the scheme provided in the present disclosure; the present disclosure is also applicable to scenarios such as cellular networks and satellites communications, where similar technical effects can be achieved. Similarly, the present disclosure is also applicable to scenarios where a format of a feedback channel is related to a configuration density of a data channel or the feedback channel itself, so as to achieve similar technical effects. Additionally, the adoption of a unified solution for various scenarios, including but not limited to V2X and non-V2X scenarios, contributes to the reduction of hardcore complexity and costs.

Further, it should be noted that the embodiments of a first node in the present disclosure and the characteristics of the embodiments may be applied to a second node or a third node if no conflict is incurred. Conversely, the embodiments of a second node in the present disclosure and characteristics of the embodiments can be applied to the first node; and the embodiments of a third node in the present disclosure and characteristics of the embodiments can be applied to the first node; and the embodiments in the present disclosure and the characteristics in the embodiments can be arbitrarily combined if there is no conflict.

The present disclosure provides a method in a first node for wireless communications, comprising:
  receiving a first signaling; and
  receiving a second signaling in a first time-frequency resource set;
  herein, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, advantages of the above method include: an association between a format of a first-type channel and a frequency bandwidth corresponding to its associated second-type channel is established, when the frequency bandwidth corresponding to the second-type channel is wider, the corresponding first-type channel capable of occupying more frequency band resources, and then the first type channel can accommodate more feedback bits of sidelink, so as to realize the multiplexing of multiple feedback information on sidelink, which increases the flexibility of PSFCH configuration and improves the efficiency of spectrum.

In one embodiment, another advantage of the above method includes: establishing an association between a format of a first-type channel and a first parameter, the first parameter corresponds to a density of time-frequency resources occupied by the first-type channel or a transmission method; the above simplifies the signaling overhead to meet the different performance requirements of the PSFCH.

According to one aspect of the present disclosure, the above method is characterized in that the frequency bandwidth corresponding to the second-type channel is a second frequency bandwidth, the second frequency bandwidth is one of K1 candidate frequency bandwidths, and the K1 candidate frequency bandwidths are respectively associated with K1 candidate formats; the format of the first-type channel is one of the K1 candidate formats associated with the second frequency bandwidth.

According to one aspect of the present disclosure, the above method is characterized in that the first parameter is a configuration of the first-type channel in time domain, a configuration of the first-type channel in time domain is a first configuration, the first configuration is one of K1 candidate configurations, and the K1 candidate configurations are respectively associated with K1 candidate formats; the format of the first-type channel is one of K1 candidate formats associated with the first configuration.

According to one aspect of the present disclosure, the above method is characterized in that the first parameter is a number of multicarrier symbol(s) occupied by the first-type channel in a slot, and the number of the multicarrier symbol(s) occupied by the first-type channel in a slot is used to determine a format adopted by the first-type channel.

According to one aspect of the present disclosure, the above method is characterized in that the first parameter is related to a number of information bit(s) carried by the first-type channel, and the number of information bit(s) carried by the first-type channel is used to determine a format adopted by the first-type signal.

According to one aspect of the present disclosure, the above method is characterized in that the first parameter is a frequency bandwidth occupied by the first-type channel, and the frequency bandwidth occupied by the first-type channel is used to determine a format adopted by the first-type signal.

According to one aspect of the present disclosure, the above method is characterized in comprising:

transmitting a first signal;

herein, the first signal is used to request a configuration information set of the first-type channel, and the configuration information set comprises the format of the first-type channel.

In one embodiment, advantages of the above method include: a configuration information set of the first-type signal is triggered based on the terminal itself, so as to avoid the signaling overhead incurred by the frequent broadcasting of a configuration information set of the first-type channel by a base station or a group head, thus improving the efficiency of spectrum.

In one embodiment, the above method is characterized in that the first signaling is used to indicate time-domain resources occupied by the second signaling.

According to one aspect of the present disclosure, the above method is characterized in that the second signaling indicates K1 candidate time-frequency resource pools, and the K1 candidate time-frequency resource pools are respectively associated with the K1 candidate formats; the first-type channel is transmitted in a first time-frequency resource pool of the K1 candidate time-frequency resource pools, and the format of the first-type channel is one of the K1 candidate formats associated with the first time-frequency resource pool.

In one embodiment, advantages of the above method include: an association between a format adopted by the first-type channel and its occupied time-frequency resource pool is established, that is, each time-frequency resource pool corresponds to a format of a PSFCH, which simplifies the signaling overhead and enables more convenient multiplexing and resource allocation of the PSFCH.

According to one aspect of the present disclosure, the above method is characterized in comprising:

receiving a target signal; and transmitting a target information group;

herein, a channel carrying the target signal is the second-type channel, and a channel carrying the target information group is the first-type channel; the target information group is used to determine whether the target signal is correctly received; a frequency bandwidth corresponding to the target signal is used to determine a format of the first-type channel carrying the target information group, or a second parameter of the target information group is used to determine a format of the first-type channel carrying the target information group.

The present disclosure provides a method in a second node for wireless communications, comprising:

transmitting a first signaling; and transmitting a second signaling in a first time-frequency resource set;

herein, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

According to one aspect of the present disclosure, the above method in characterized in that the frequency bandwidth corresponding to the second-type channel is a second frequency bandwidth, the second frequency bandwidth is one of K1 candidate frequency bandwidths, and the K1 candidate frequency bandwidths are respectively associated with K1 candidate formats; the format of the first-type channel is one of the K1 candidate formats associated with the second frequency bandwidth.

According to one aspect of the present disclosure, the above method in characterized in that the first parameter is a configuration of the first-type channel in time domain, a configuration of the first-type channel in time domain is a first configuration, the first configuration is one of K1 candidate configurations, and the K1 candidate configurations are respectively associated with K1 candidate formats; the format of the first-type channel is one of K1 candidate formats associated with the first configuration.

According to one aspect of the present disclosure, the above method is characterized in that the first parameter is a number of multicarrier symbol(s) occupied by the first-type channel in a slot, and the number of the multicarrier symbol(s) occupied by the first-type channel in a slot is used to determine a format adopted by the first-type channel.

According to one aspect of the present disclosure, the above method is characterized in that the first parameter is related to a number of information bit(s) carried by the first-type channel, and the number of information bit(s) carried by the first-type channel is used to determine a format adopted by the first-type signal.

According to one aspect of the present disclosure, the above method is characterized in that the first parameter is a frequency bandwidth occupied by the first-type channel, and the frequency bandwidth occupied by the first-type channel is used to determine a format adopted by the first-type signal.

According to one aspect of the present disclosure, the above method is characterized in comprising:

receiving a first signal;

herein, the first signal is used to request a configuration information set of the first-type channel, and the configuration information set comprises the format of the first-type channel.

In one embodiment, the above method is characterized in that the first signaling is used to indicate time-domain resources occupied by the second signaling.

According to one aspect of the present disclosure, the above method is characterized in that the second signaling indicates K1 candidate time-frequency resource pools, and the K1 candidate time-frequency resource pools are respectively associated with the K1 candidate formats; the first-type channel is transmitted in a first time-frequency resource pool of the K1 candidate time-frequency resource pools, and the format of the first-type channel is one of the K1 candidate formats associated with the first time-frequency resource pool.

The present disclosure provides a method in a third node for wireless communications, comprising:
receiving a first signaling; and
receiving a second signaling in a first time-frequency resource set;
herein, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

According to one aspect of the present disclosure, the above method is characterized in that the frequency bandwidth corresponding to the second-type channel is a second frequency bandwidth, the second frequency bandwidth is one of K1 candidate frequency bandwidths, and the K1 candidate frequency bandwidths are respectively associated with K1 candidate formats; the format of the first-type channel is one of the K1 candidate formats associated with the second frequency bandwidth.

According to one aspect of the present disclosure, the above method is characterized in that the first parameter is a configuration of the first-type channel in time domain, a configuration of the first-type channel in time domain is a first configuration, the first configuration is one of K1 candidate configurations, and the K1 candidate configurations are respectively associated with K1 candidate formats; the format of the first-type channel is one of K1 candidate formats associated with the first configuration.

According to one aspect of the present disclosure, the above method is characterized in that the first parameter is a number of multicarrier symbol(s) occupied by the first-type channel in a slot, and the number of the multicarrier symbol(s) occupied by the first-type channel in a slot is used to determine a format adopted by the first-type channel.

According to one aspect of the present disclosure, the above method is characterized in that the first parameter is related to a number of information bit(s) carried by the first-type channel, and the number of information bit(s) carried by the first-type channel is used to determine a format adopted by the first-type signal.

According to one aspect of the present disclosure, the above method is characterized in that the first parameter is a frequency bandwidth occupied by the first-type channel, and the frequency bandwidth occupied by the first-type channel is used to determine a format adopted by the first-type signal.

In one embodiment, the above method is characterized in that the first signaling is used to indicate time-domain resources occupied by the second signaling.

According to one aspect of the present disclosure, the above method is characterized in that the second signaling indicates K1 candidate time-frequency resource pools, and the K1 candidate time-frequency resource pools are respectively associated with the K1 candidate formats; the first-type channel is transmitted in a first time-frequency resource pool of the K1 candidate time-frequency resource pools, and the format of the first-type channel is one of the K1 candidate formats associated with the first time-frequency resource pool.

According to one aspect of the present disclosure, the above method is characterized in comprising:
transmitting a target signal; and
receiving a target information group;
herein, a channel carrying the target signal is a second-type channel, and a channel carrying the target information group is a first-type channel; the target information group is used to determine whether the target signal is correctly received; a frequency bandwidth corresponding to the target signal is used to determine a format of the first-type channel carrying the target information group, or a second parameter of the target information group is used to determine a format of the first-type channel carrying the target information group.

The present disclosure provides a first node for wireless communications, comprising:
a first transceiver, receiving a first signaling; and
a first receiver, receiving a second signaling in a first time-frequency resource set;
herein, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

The present disclosure provides a second node for wireless communications, comprising:
a third transceiver, transmitting a first signaling; and
a first transmitter, transmitting a second signaling in a first time-frequency resource set;
herein, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

The present disclosure provides a third node for wireless communications, comprising:
a second receiver, receiving a first signaling; and
a third receiver, receiving a second signaling in a first time-frequency resource set;
herein, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, the present disclosure has the following advantages over conventional schemes:
an association between a format of a first-type channel and a frequency bandwidth corresponding to its associated second-type channel is established, when the frequency bandwidth corresponding to the second-type channel is wider, the corresponding first-type channel capable of occupying more frequency band resources, and then the first type channel can accommodate more feedback bits of sidelink, so as to realize the multiplexing of multiple feedback information on sidelink, which increases the flexibility of PSFCH configuration and improves the efficiency of spectrum;

establishing an association between a format of a first-type channel and a first parameter, the first parameter corresponds to a density of time-frequency resources occupied by the first-type channel, or a transmission method; —the above simplifies the signaling overhead to meet the different performance requirements of the PSFCH;

a configuration information set of the first-type signal is triggered based on the terminal itself, so as to avoid the signaling overhead incurred by the frequent broadcasting of a configuration information set of the first-type channel by a base station or a group head, thus improving the efficiency of spectrum.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
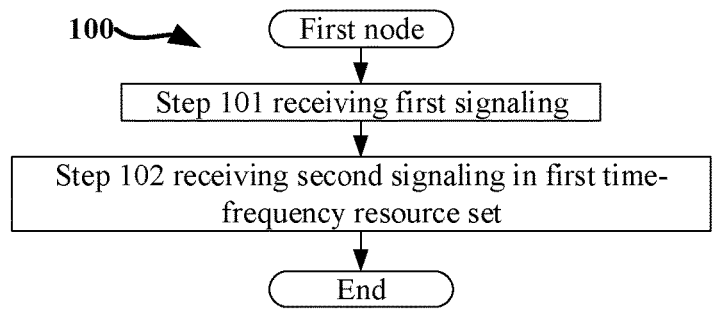
FIG. 1 illustrates a flowchart of the processing of a first node according to one embodiment of the present disclosure.

Embodiment 1 illustrates a flowchart of the processing of a first node, as shown in FIG. 1. In step 100 illustrated by FIG. 1, each box represents a step. In embodiment 1, a first node in the present disclosure receives a first signaling in step 101; in step 102, receives a second signaling in a first time-frequency resource set;

In embodiment 1, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, the first signaling is broadcast.

In one embodiment, the first signaling is a dynamic signaling.

In one embodiment, the first signaling is unicast.

In one embodiment, the first signaling is Downlink Control Information (DCI).

In one embodiment, a physical layer channel carrying the first signaling comprises a Physical Downlink Control Channel (PDCCH).

In one embodiment, the first signaling is Sidelink Control Information (SCI).

In one embodiment, a physical layer channel carrying the first signaling comprises a Physical Sidelink Control Channel (PSCCH).

In one embodiment, the second signaling is a Radio Resource Control (RRC) signaling for sidelink.

In one embodiment, the second signaling is an RRC signaling transmitted on a cellular link.

In one embodiment, the second signaling is a broadcast signaling.

In one embodiment, the second signaling is a System Information Block (SIB).

In one embodiment, the second signaling is an RRC signaling.

In one embodiment, the second signaling is UE-Specific.

In one embodiment, the second signaling is used to configure a PSFCH.

In one embodiment, the second signaling comprises a periodPSFCHresource IE.

In one embodiment, the second signaling comprises a MinTimeGapPSFCH IE.

In one embodiment, the first signaling is used to indicate a frequency-domain location of a subcarrier occupied by the first time-frequency resource set.

In one embodiment, the first signaling is used to indicate a time-domain location of a multicarrier symbol occupied by the first time-frequency resource set.

In one embodiment, the first time-frequency resource set occupies at least one Resource Element (RE).

In one embodiment, the RE occupies a subcarrier in frequency domain and a duration of a multicarrier symbol in time domain.

In one embodiment, the first-type channel is a PSFCH.

In one embodiment, a format of the first-type channel is one of K1 candidate formats, and K1 is a positive integer not less than 2.

In one subembodiment of the above embodiment, K1 is equal to 4.

In one subembodiment of the above embodiment, K1 is equal to 2.

In one subembodiment of the above embodiment, the K1 candidate formats are respectively PSFCH format 0 to PSFCH format (K1-1).

In one subembodiment of the above embodiment, the K1 candidate formats at least comprise a first candidate format and a second candidate format, a first-type channel corresponding to the first candidate format is generated through sequence, and a first-type channel corresponding to the second candidate format is generated through coding.

In one subembodiment of the above embodiment, the K1 candidate formats at least comprise a third candidate format, and a first-type channel corresponding to the third candidate format is repeatedly transmitted.

In one embodiment, the frequency bandwidth corresponding to the second-type channel is used to determine the format of the first-type channel.

In one embodiment, the first parameter of the first-type channel is used to determine the format of the first-type channel.

In one embodiment, the meaning of the phrase of a second-type channel being associated with the first-type channel includes: the first-type channel is used to determine whether the second-type channel is correctly received.

In one embodiment, the meaning of the phrase of a second-type channel being associated with the first-type channel includes: the first-type channel is used to indicate whether the second-type channel is correctly received.

In one embodiment, the meaning of the phrase of a second-type channel being associated with the first-type channel includes: the first-type channel is a PSFCH, the second-type signal is a Physical Sidelink Shared Channel (PSSCH), and the first-type channel is used to indicate whether the second-type channel is correctly received.

In one embodiment, both the first signaling and the second signaling are transmitted on cellular link.

In one embodiment, both the first signaling and the second signaling are transmitted on sidelink.

In one embodiment, both the first-type signaling and the second-type signaling are transmitted on sidelink.

In one embodiment, the sidelink refers to a radio link between terminals.

In one embodiment, the cellular link in the present disclosure is a radio link between a terminal and a base station.

In one embodiment, the sidelink in the present disclosure corresponds to a Proximity Communication (PC)-5 interface.

In one embodiment, the cellular link in the present disclosure corresponds to a Uu port.

In one embodiment, the sidelink in the present disclosure is used for V2X communications.

In one embodiment, the cellular link in the present disclosure is used for cellular communications.

In one embodiment, the resource element in the present disclosure occupies a subcarrier in frequency domain and a multicarrier symbol in time domain.

In one embodiment, the multicarrier symbol in the present disclosure is an Orthogonal Frequency Division Multiplexing (OFDM) symbol.

In one embodiment, the multicarrier symbol in the present disclosure is a Single Carrier-Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is an PFDM symbol comprising a Cyclic Prefix (CP).

In one embodiment, the multi-carrier symbol in the present disclosure is a Discrete Fourier Transform Spreading Orthogonal Frequency Division Multiplexing (DFT-s-OFDM) symbol comprising a CP.

Embodiment 2

Figure 2:
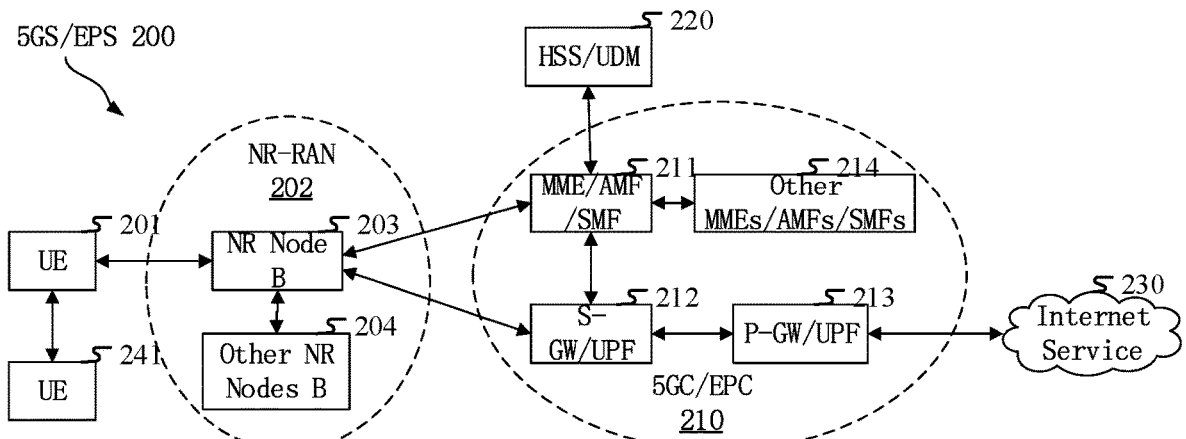
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in V2X communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an Sl/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the gNB 203 corresponds to the second node in the present disclosure.

In one embodiment, the UE 241 corresponds to the second node in the present disclosure.

In one embodiment, the UE 241 corresponds to the third node in the present disclosure.

In one embodiment, a radio interface between the UE 201 and the gNB 203 is a Uu interface.

In one embodiment, an air interface between the UE 201 and the UE 241 is a PC-5 interface.

In one embodiment, a radio link between the UE 201 and the gNB 203 is a cellular link.

In one embodiment, a radio link between the UE 201 and the UE 241 is a sidelink.

In one embodiment, the first node in the present disclosure is a terminal within the coverage of the gNB 203.

In one embodiment, the third node in the present disclosure is a terminal located within the coverage of the gNB 203.

In one embodiment, the third node in the present disclosure is a terminal located out of the coverage of the gNB 203.

In one embodiment, unicast transmission is supported between the UE 201 and the UE 241.

In one embodiment, broadcast transmission is supported between the UE 201 and the UE 241.

In one embodiment, groupcast transmission is supported between the UE 201 and the UE 241.

In one embodiment, the first node and the third node belong to a V2X pair.

In one embodiment, the first node is a car.

In one embodiment, the first node is a vehicle.

In one embodiment, the first node is a Road Side Unit (RSU).

In one embodiment, the first node is a group header of a terminal group.

In one embodiment, the third node is a vehicle.

In one embodiment, the third node is a car.

In one embodiment, the third node is an RSU.

In one embodiment, the third node is a group header of a terminal group.

In one embodiment, the second node is a base station.

In one embodiment, the second node is a serving cell.

Embodiment 3

Figure 3:
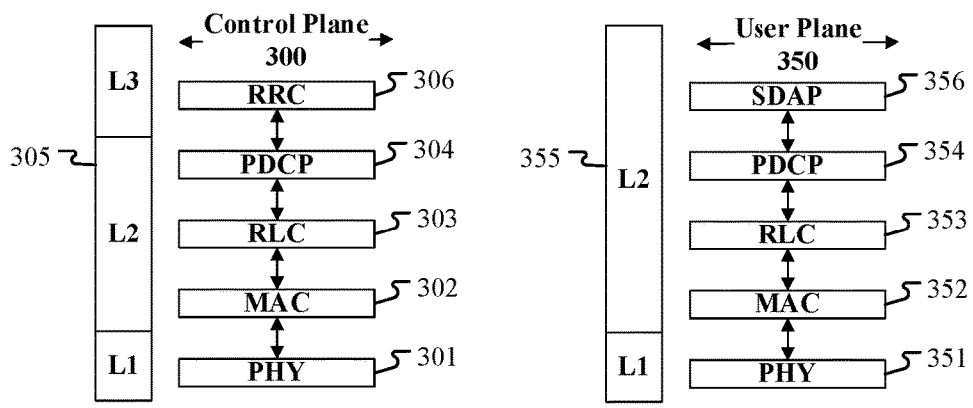
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first signaling is generated by the PHY 301 or the PHY 351.

In one embodiment, the first signaling is generated by the MAC 352 or the MAC 302.

In one embodiment, the second signaling is generated by the MAC 352 or the MAC 302.

In one embodiment, the second signaling is generated by the RRC 306.

In one embodiment, the first signal is generated by the PHY 301 or the PHY 351.

In one embodiment, the first signal is generated by the MAC 352 or the MAC 302.

In one embodiment, the target signal is generated by the PHY 301 or the PHY 351.

In one embodiment, the target signal is generated by the MAC 352 or the MAC 302.

In one embodiment, the target information group is generated by the PHY 301 or the PHY 351.

In one embodiment, the target information group is generated by the MAC 352 or the MAC 302.

Embodiment 4

Figure 4:
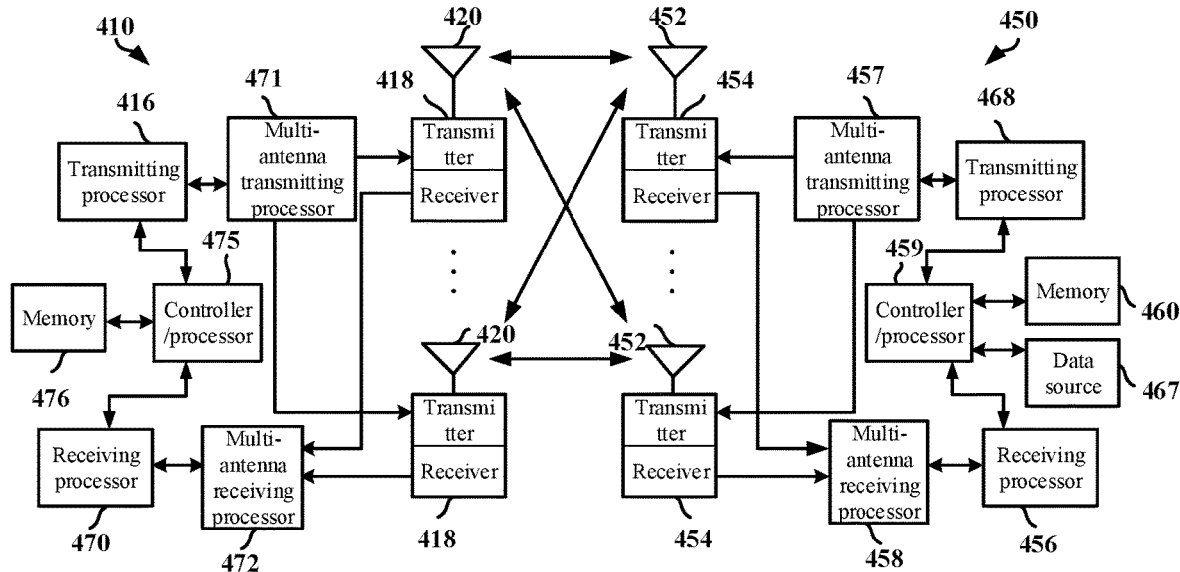
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least receives a first signaling; and receives a second signaling in a first time-frequency resource set; herein, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, the first communication device 450 comprises at least one processor and at least one memory. a memory that stores a computer readable instruction program. The computer readable instruction program generates an action when executed by at least one processor. The action includes: receiving a first signaling; and receiving a second signaling in a first time-frequency resource set; the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits a first signaling; and transmits a second signaling in a first time-frequency resource set; the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, the second communication device 410 comprises a memory that stores a computer readable instruction program. The computer readable instruction program generates an action when executed by at least one processor. The action includes: transmitting a first signaling; and transmitting a second signaling in a first time-frequency resource set; the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, the second communication device 410 comprises at least one processor and at least one memory. The at least one memory comprises computer program codes; the at least one memory and the computer program codes are configured to be used in collaboration with the at least one processor. The second communication device 410 at least receives a first signaling; and receives a second signaling in a first time-frequency resource set; the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, the second communication device 410 comprises a memory that stores a computer readable instruction program. The computer readable instruction program generates an action when executed by at least one processor. The action includes: receiving a first signaling; and receiving a second signaling in a first time-frequency resource set; the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, the first communication device 450 corresponds to a first node in the present disclosure.

In one embodiment, the second communication device 410 corresponds to a second node in the present disclosure.

In one embodiment, the second communication device 410 corresponds to a third node in the present disclosure.

In one embodiment, the first communication device 450 is a UE.

In one embodiment, the second communication device 410 is a UE.

In one embodiment, the second communication device 410 is a base station.

In one embodiment, at least one of the antenna 452, the receiver 454, the multi-antenna receiving processor 458, the receiving processor 456 or the controller/processor 459 is used to receive a first signaling; at least one of the antenna 420, the transmitter 418, the multi-antenna transmitting processor 471, the transmitting processor 416 or the controller/processor 475 is used to transmit a first signaling.

In one embodiment, at least one of the antenna 452, the receiver 454, the multi-antenna receiving processor 458, the receiving processor 456 and the controller/processor 459 is used to receive a second signaling in a first time-frequency resource set; at least one of the antenna 420, the transmitter 418, the multi-antenna transmitting processor 471, the transmitting processor 416 and the controller/processor 475 is used to transmit a second signaling in a first time-frequency resource set.

In one embodiment, at least one of the antenna 452, the transmitter 454, the multi-antenna transmitting processor 457, the transmitting processor 468, and the controller/processor 459 is used to transmit; at least one of the antenna 420, the receiver 418, the multi-antenna receiving processor 472, the receiving processor 470 and the controller/processor 475 is used to receive a first signal.

In one embodiment, at least one of the antenna 452, the receiver 454, the multi-antenna receiving processor 458, the receiving processor 456 and the controller/processor 459 are used to receive a target signal; at least one of the antenna 420, the transmitter 418, the multi-antenna transmitting processor 471, the transmitting processor 416 and the controller/processor 475 is used to transmit a target signal.

In one embodiment, at least one of the antenna 452, the transmitter 454, the multi-antenna transmitting processor 457, the transmitting processor 468, and the controller/processor 459 are used to transmit a target information group; at least one of the antenna 420, the receiver 418, the multi-antenna receiving processor 472, the receiving processor 470 and the controller/processor 475 is used to receive a target information group.

Embodiment 5

Figure 5:
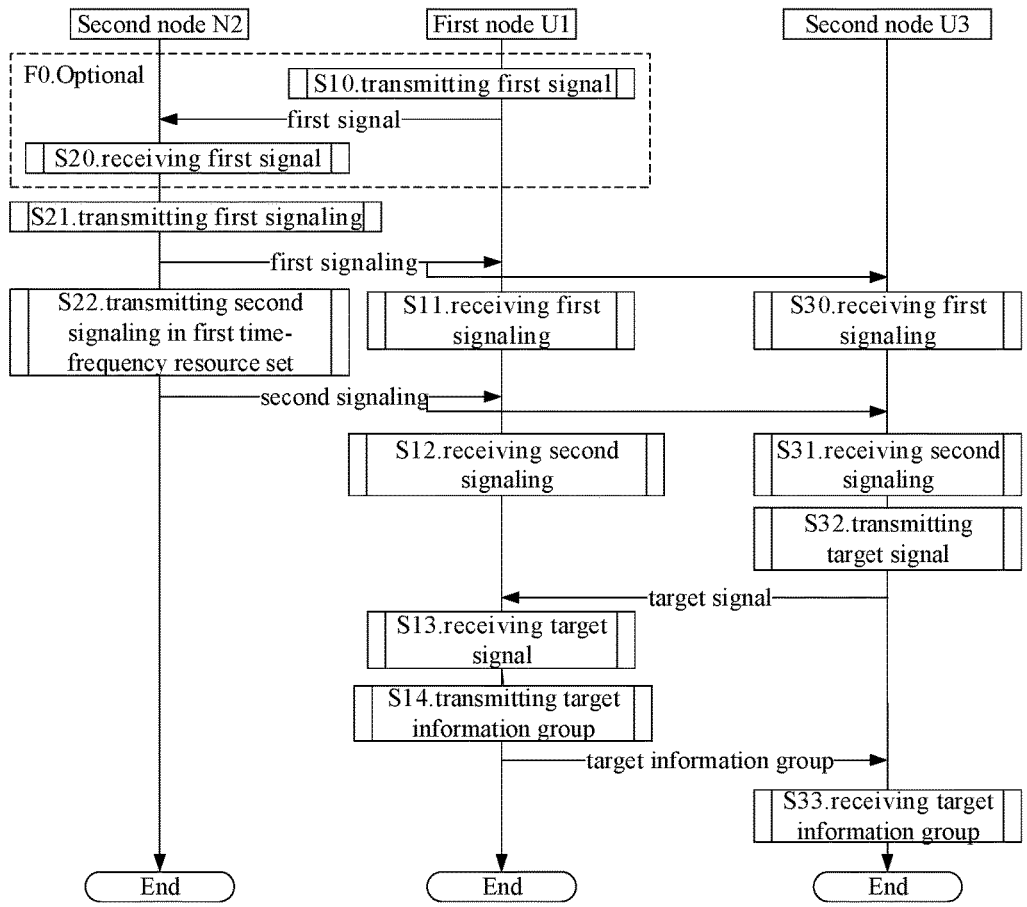
FIG. 5 illustrates a flowchart of a first signaling according to one embodiment of the present disclosure.

Embodiment 5 illustrates a flowchart of a first signaling, as shown in FIG. 5. In FIG. 5, a first node U1 and a second node N2 are in communications via a radio link, and a first node U1 and a third node U3 are in communications via a radio link, where steps in box F0 are optional.

The first node U1 transmits a first signal in step S10, receives a first signaling in step S11, receives a second signaling in a first time-frequency resource set in step S12, receives a target signal in step S13, and transmits a target information group in step S14.

The second node N2 receives a first signal in step S20, transmits a first signaling in step S21, and transmits a second signaling in a first time-frequency resource set in step S22.

The third node U3 receives a first signaling in step S30, receives a second signaling in a first time-frequency resource set in step S31, transmits a target signal in step S32, and receives a target information group in step S33.

In embodiment 5, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling; the first signal is used to request a configuration information set of the first-type channel, and the configuration information set comprises the format of the first-type channel; a channel carrying the target signal is the second-type channel, and a channel carrying the target information group is the first-type channel; the target information group is used to determine whether the target signal is correctly received; a frequency bandwidth corresponding to the target signal is used to determine a format of the first-type channel carrying the target information group, or a second parameter of the target information group is used to determine a format of the first-type channel carrying the target information group.

In one embodiment, the frequency bandwidth corresponding to the second-type channel is a second frequency bandwidth, the second frequency bandwidth is one of K1 candidate frequency bandwidths, and the K1 candidate frequency bandwidths are respectively associated with K1 candidate formats; the format of the first-type channel is one of the K1 candidate formats associated with the second frequency bandwidth.

In one subembodiment of the above embodiment, the frequency bandwidth corresponding to the second-type channel refers to: a minimum number of Resource Block(s) (RBs) occupied by the second-type channel infrequency domain.

In one subembodiment of the above embodiment, the frequency bandwidth corresponding to the second-type channel refers to: an actual number of RB(s) occupied by the second-type channel in frequency domain.

In one subembodiment of the above embodiment, the frequency bandwidth corresponding to the second-type channel refers to: a granularity of frequency-domain resources occupied by the second-type channel.

In one subembodiment of the above embodiment, the frequency bandwidth corresponding to the second-type channel refers to: a minimum frequency bandwidth that can be adopted to schedule the second-type channel.

In one subembodiment of the above embodiment, the frequency bandwidth corresponding to the second-type channel refers to: a number of sub-channel(s) occupied by the second-type channel in frequency domain.

In one subembodiment of the above embodiment, the frequency bandwidth corresponding to the second-type channel refers to: a number of RB(s) occupied one of sub-channel(s) occupied by the second-type channel in frequency domain.

In one subembodiment of the above embodiment, any of the K1 candidate frequency bandwidths corresponds to at least one subcarrier.

In one subembodiment of the above embodiment, any of the K1 candidate frequency bandwidths corresponds to at least one RB.

In one subembodiment of the above embodiment, any of the K1 candidate frequency bandwidths corresponds to at least one sub-channel.

In one embodiment, the first parameter is a configuration of the first-type channel in time domain, a configuration of the first-type channel in time domain is a first configuration, the first configuration is one of K1 candidate configurations, and the K1 candidate configurations are respectively associated with K1 candidate formats; the format of the first-type channel is one of K1 candidate formats associated with the first configuration.

In one subembodiment of the above embodiment, the configuration of the first-type channel in time domain refers to: a number of multicarrier symbol(s) occupied by the first-type channel in a unit time.

In one subsidiary embodiment of the subembodiment, the unit time is equal to at least one millisecond.

In one subsidiary embodiment of the subembodiment, the unit time is a period of the first-type channel.

In one subembodiment of the above embodiment, the K1 candidate configurations respectively correspond to a number of multicarrier symbol(s) occupied by the first-type channel in a time unit.

In one subembodiment of the above embodiment, the configuration of the first-type channel in time domain refers to: a configuration period adopted by the first-type channel.

In one subembodiment of the above embodiment, the K1 candidate configurations are respectively K1 different configuration periods of the first-type channel.

In one embodiment, the first parameter is a number of multicarrier symbol(s) occupied by the first-type channel in a slot, and the number of the multicarrier symbol(s) occupied by the first-type channel in a slot is used to determine a format adopted by the first-type channel.

In one subembodiment of the above embodiment, a number of multicarrier symbol(s) occupied by the first-type channel in a slot is one of the K1 candidate positive integers, the K1 candidate positive integers respectively correspond to K1 candidate formats, and the format of the first-type channel is one of the K1 candidate formats associated with the number of multicarrier symbol(s) occupied by the first-type channel in a slot.

In one subembodiment of the above embodiment, a number of multicarrier symbol(s) occupied by the first-type channel in a slot is one of the K1 candidate positive integers, the K1 candidate positive integers at least comprise 1 and 2.

In one embodiment, the first parameter is related to a number of information bit(s) carried by the first-type channel, and the number of information bit(s) carried by the first-type channel is used to determine a format adopted by the first-type signal.

In one subembodiment of the above embodiment, a number of information bit(s) carried by the first-type channel is equal to Q1, Q1 belong to one of K1 intervals, the K1 intervals respectively correspond to K1 candidate formats, and the format of the first-type channel is one of the K1 candidate formats associated with an interval to which Q1 belongs.

In one subsidiary embodiment of the subembodiment, the K1 intervals at least comprises interval 1 and interval 2, a corresponding information bit carried by the interval 1 is equal to 1, and a corresponding information bit carried by the interval 2 is greater than 1.

In one subsidiary embodiment of the subembodiment, the K1 intervals at least comprise interval 1 and interval 2, a corresponding information bit carried by the interval 1 is not greater than 2, and a corresponding information bit carried by the interval 2 is greater than 2.

In one embodiment, the first parameter is a frequency bandwidth occupied by the first-type channel, and the frequency bandwidth occupied by the first-type channel is used to determine a format adopted by the first-type signal.

In one subembodiment of the above embodiment, the frequency bandwidth occupied by the first-type channel is a first frequency bandwidth, the first frequency bandwidth is one of K1 first-type frequency bandwidths, and the K1 first-type frequency bandwidths are respectively associated with K1 candidate formats; the format of the first-type channel is one of the K1 candidate formats associated with the first frequency bandwidth.

In one subembodiment of the above embodiment, the frequency bandwidth occupied by the first-type channel refers to: a number of RB(s) occupied by the first type of channel in frequency domain.

In one subembodiment of the above embodiment, the frequency bandwidth occupied by the first-type channel refers to: a number of sub-channel(s) occupied by the first-type channel.

In one subembodiment of the above embodiment, any of the K1 first-type frequency bandwidths respectively correspond to at least one subcarrier.

In one subembodiment of the above embodiment, any of the K1 first-type frequency bandwidths respectively correspond to at least one RB.

In one subembodiment of the above embodiment, any of the K1 first-type frequency bandwidths respectively correspond to at least one sub-channel.

In one embodiment, the first signal is a Buffer Status Report (BSR).

In one embodiment, the first signal is a Scheduling Request (SR).

In one embodiment, the first signal is used to request an establishment of an RRC connection of sidelink.

In one embodiment, the first signal is used to request a sidelink-related RRC configuration.

In one embodiment, the first signal is used to request a transmission of the first signaling and a transmission of the second signaling.

In one embodiment, a physical layer channel carrying the first signal comprises a Physical Random Access Channel (PRACH).

In one embodiment, a physical layer channel carrying the first signal comprises a Physical Uplink Shared Channel (PUSCH).

In one embodiment, the first signaling is used to indicate time-domain resources occupied by the second signaling.

In one subembodiment of the above embodiment, the first signaling is used to indicate a time interval from the second signaling to the first signaling.

In one subembodiment of the above embodiment, the first signaling is transmitted in slot N, the second signaling is transmitted in slot N+N1, and the first signaling is used to indicate N1; N and N1 are both non-negative integers.

In one embodiment, the second signaling indicates K1 candidate time-frequency resource pools, and the K1 candidate time-frequency resource pools are respectively associated with the K1 candidate formats; the first-type channel is transmitted in a first time-frequency resource pool of the K1 candidate time-frequency resource pools, and the format of the first-type channel is one of the K1 candidate formats associated with the first time-frequency resource pool.

In one subembodiment of the above embodiment, a given candidate time-frequency resource pool is any of the K1 candidate time-frequency resource pools, the given candidate time-frequency resource pool comprises M1 candidate time-frequency resource sets, and there at least exist two of the M1 candidate time-frequency resource sets being discrete.

In one subembodiment of the above embodiment, a given candidate format is any of the K1 candidate formats, the given candidate format is associated with a given candidate time-frequency resource pool in the K1 candidate time-frequency resource pools, the first node U1 determines that the first-type channel adopts the given candidate format, and the first-type channel is transmitted in the given candidate time-frequency resource pool.

In one subembodiment of the above embodiment, any of the K1 candidate time-frequency resource pools comprises at least one RE.

In one embodiment, a physical layer channel carrying the target signal is a PSSCH.

In one embodiment, a transmission channel carrying the target signal is a Sidelink Shared Channel (SL-SCH).

In one embodiment, the target signal is generated by a Transmission Block (TB).

In one embodiment, the target signal is transmitted on sidelink.

In one embodiment, a physical layer channel carrying the target information group is a PSFCH.

In one embodiment, a second parameter of the target information group is a configuration of the first-type channel in time domain.

In one embodiment, a second parameter of the target information group is a number of multicarrier symbol(s) occupied by a physical channel generated by the target information group in a slot.

In one embodiment, a second parameter of the target information group is a number of information bit(s) carried by the target information group.

In one embodiment, a second parameter of the target information group is a frequency bandwidth occupied by a physical channel generated by the target information group.

Embodiment 6

Figure 6:
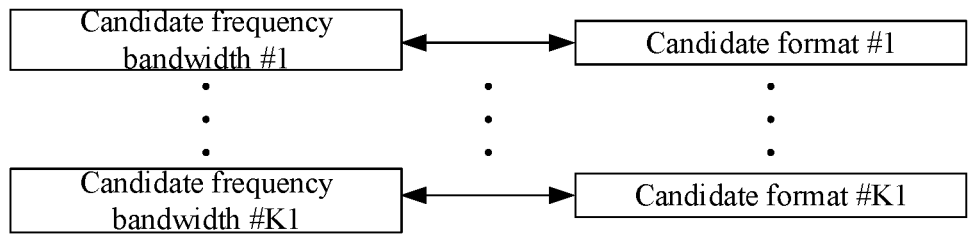
FIG. 6 illustrates a schematic diagram of a second frequency bandwidth according to one embodiment of the present disclosure.

Embodiment 6 illustrates a schematic diagram of a second frequency bandwidth, as shown in FIG. 6. In FIG. 6, the second frequency bandwidth is one of K1 candidate frequency bandwidths, and the K1 candidate frequency bandwidths respectively correspond to K1 candidate formats; the K1 candidate frequency bandwidths respectively correspond to candidate frequency bandwidth #1 to candidate frequency bandwidth #K1 in the figure, and the K1 candidate formats respectively correspond to candidate format #1 to candidate format #K1 in the figure; without conflict, embodiments in embodiment 6 can be applied to embodiments 7 to 9 and other embodiments in the present disclosure.

In one embodiment, any of the K1 candidate frequency bandwidths occupies at least one subcarrier.

In one subembodiment of the above embodiment, the at least one subcarrier is consecutive.

In one embodiment, the K1 candidate bandwidth respectively correspond to K1 different numbers of subcarriers.

In one embodiment, there at least exist two of the K1 candidate frequency bandwidths respectively corresponding to two different numbers of subcarriers.

In one embodiment, the K1 candidate formats respectively correspond to K1 different payloads.

In one embodiment, the K1 candidate formats respectively correspond to K1 different carrying numbers of information bits.

In one embodiment, there at least exist two of the K1 candidate formats corresponding to two different loads.

In one embodiment, there at least exist two of the K1 candidate formats respectively corresponding to two different carrying numbers of information bits.

Embodiment 7

Figure 7:
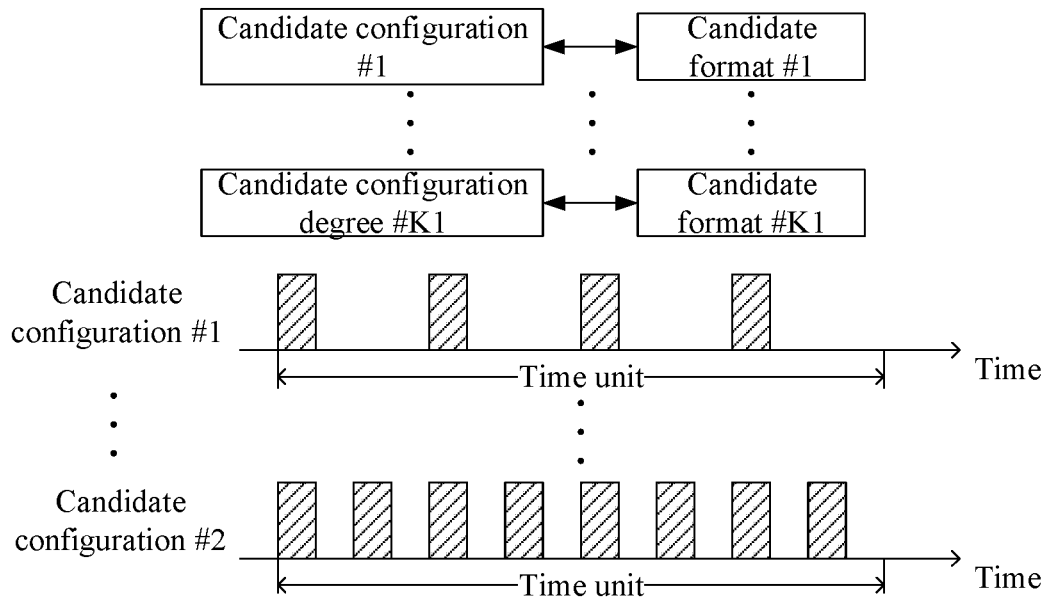
FIG. 7 illustrates a schematic diagram of a configuration of a first-type channel in time domain according to one embodiment of the present disclosure.

Embodiment 7 illustrates a schematic diagram of a first-type channel in time domain, as shown in FIG. 7. In FIG. 7, a configuration of the first-type channel in time domain is a first configuration, the first configuration is one of K1 candidate configurations, and the K1 candidate configurations are respectively associated with K1 candidate formats; the format of the first-type channel is one of K1 candidate formats associated with the first configuration; K1 candidate configurations in the figure respectively correspond to K1 candidate formats; the shaded parts in the figure correspond to time-domain resources occupied by the first-type channel under different candidate configurations; the K1 candidate configurations respectively correspond to candidate configuration #1 to candidate configuration #K1 in FIG. 7, and the K1 candidate formats respectively correspond to candidate format #1 to candidate format #K1 in FIG. 7.

In one embodiment, the K1 candidate configurations respectively correspond to K1 different configuration densities of the first-type channel in time domain in time unit.

In one embodiment, the K1 candidate configurations respectively correspond to K1 different multicarrier symbols occupied by the first-type channel in unit time.

In one embodiment, the K1 candidate configurations respectively correspond to K1 different configuration periods.

Embodiment 8

Figure 8:
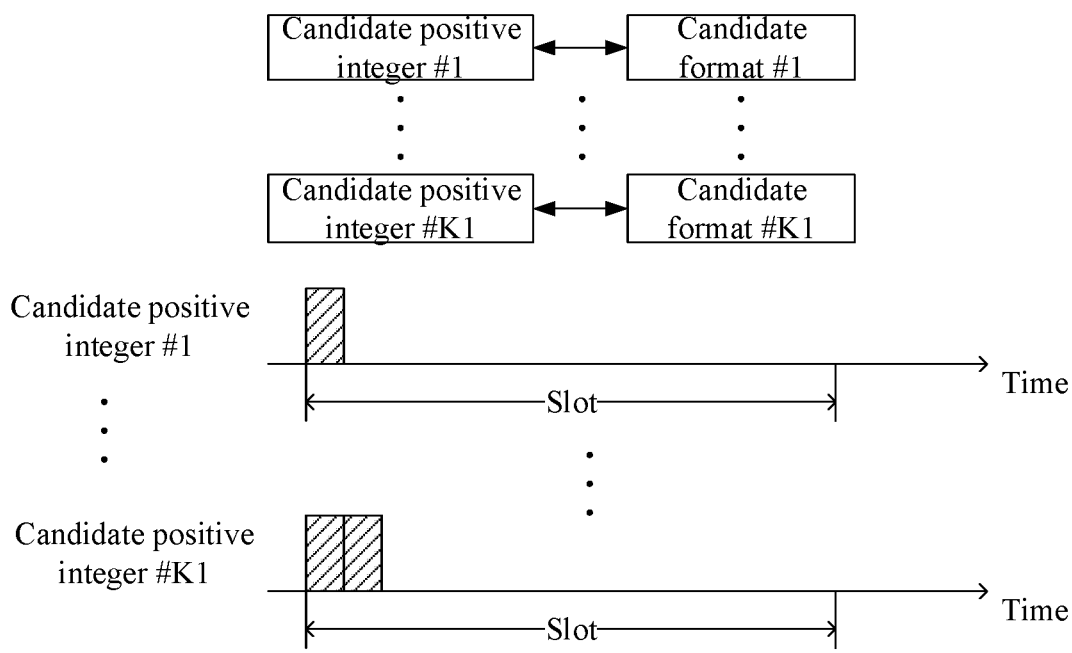
FIG. 8 illustrates a schematic diagram of a first-type channel in time domain according to one embodiment of the present disclosure.

Embodiment 8 illustrates a schematic diagram of a first-type channel in time domain, as shown in FIG. 8. In FIG. 8, a number of multicarrier symbol(s) occupied by the first-type channel in a slot is one of the K1 candidate positive integers, the K1 candidate positive integers respectively correspond to K1 candidate formats, and the format of the first-type channel is one of the K1 candidate formats associated with the number of multicarrier symbols occupied by the first-type channel in a slot; the K1 candidate positive integers are respectively candidate positive integer #1 to candidate positive integer #K1 shown in FIG. 8, and the K1 candidate formats respectively correspond to candidate format #1 to candidate format #K1 in FIG. 8; the shaded parts in the figure correspond to multicarrier symbols occupied by the first-type channel in a slot under different candidate positive integers.

In one embodiment, illustrated K1 candidate positive integers comprise at least 1 and 2.

In one embodiment, at least two of the K1 candidate positive integers are different.

In one embodiment, any two of the K1 candidate positive integers are different.

Embodiment 9

Figure 9:
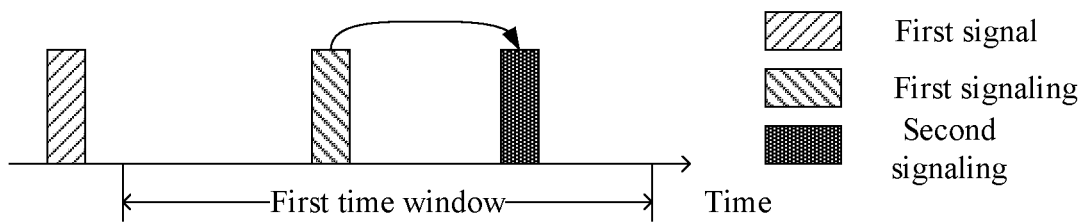
FIG. 9 illustrates a schematic diagram of a first signal according to one embodiment of the present disclosure.

Embodiment 9 illustrates a schematic diagram of a first signal according to the present disclosure, as shown in FIG. 9. In FIG. 9, the first node detects a first signaling and a second signaling in a first time window after transmitting the first signal; the first signaling is used to indicate time-domain resources occupied by the second signaling.

In one embodiment, the first signal is a PRACH.

In one embodiment, the first signal is a BSR.

In one embodiment, the first signaling is used to determine an update time of a next broadcast signaling, and the second signaling is a broadcast signaling.

In one embodiment, the first signaling is used to determine an update time of next system information, and the second signaling is system information.

In one embodiment, the first time window occupies at least one consecutive slot in time domain.

Embodiment 10

Figure 10:
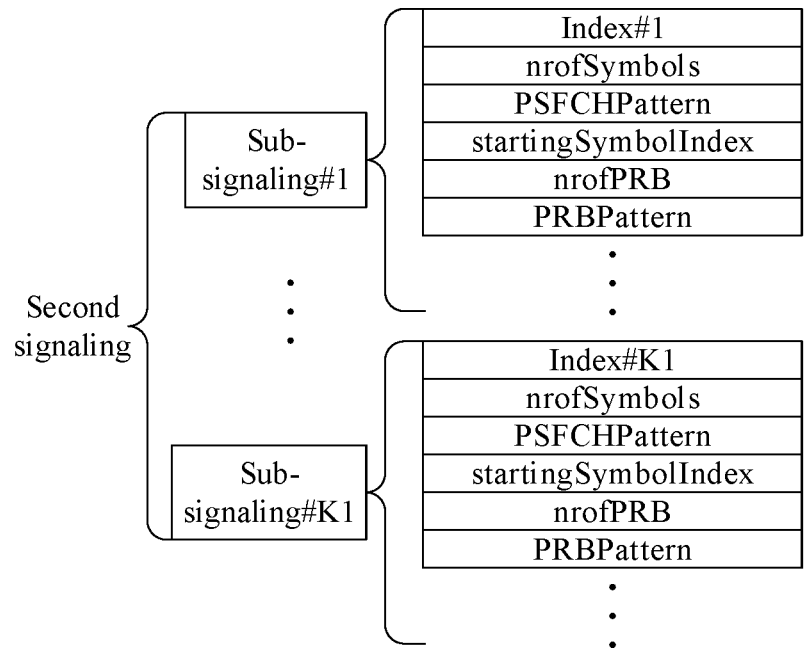
FIG. 10 illustrates a schematic diagram of a second signaling according to one embodiment of the present disclosure.

Embodiment 10 illustrates a schematic diagram of a second signaling according to one embodiment of the present disclosure, as shown in FIG. 10. In FIG. 10, the second signaling comprises K1 sub-signalings, and the K1 sub-signalings respectively correspond to sub-signaling #1 to sub-signaling #K1 in the figure; the K1 sub-signalings respectively comprise configuration information sets of the first-type channel in K1 candidate formats. In FIG. 10, the K1 sub-signalings respectively comprise K1 indexes (corresponding to index #1 to index #K1), and the K1 indexes respectively correspond to K1 candidate bandwidths corresponding to the second-type channel; the figure also shows an example of Information Elements (IEs) comprised in one of the K1 sub-signalings, as shown in the figure, information carried by the sub-signaling comprises at least one of the following:

nrofSymbols, indicating a number of multicarrier symbol(s) occupied by a first-type channel in a slot;

PSFCHPattern, indicating a pattern of a first-type channel in a slot;

startingSymbolIndex, indicating a location of a first multicarrier symbol occupied by a first-type channel in a slot;

nrofPRB, indicating a number of PRB(s) occupied by a first-type channel;

PRBPattern, indicating a pattern of PRB(s) occupied by a first-type channel in frequency domain.

In one embodiment, the K1 sub-signalings are respectively used to determine K1 time-frequency resource pools allocated to the first-type channel.

In one embodiment, the K1 indexes are respectively associated with K1 time-frequency resource pools allocated to the second-type channel.

Embodiment 11

Figure 11:
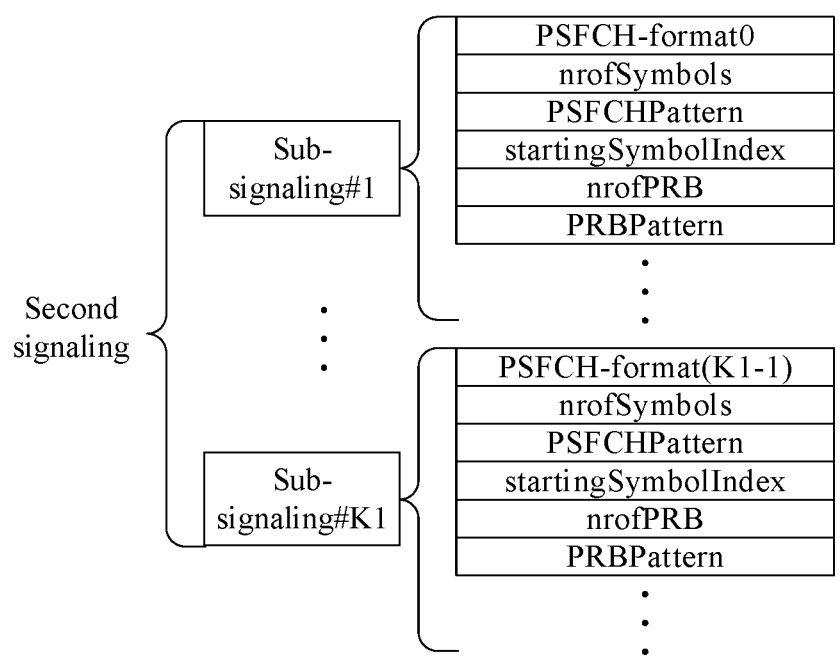
FIG. 11 illustrates a schematic diagram of a second signaling according to another embodiment of the present disclosure.

Embodiment 11 illustrates a schematic diagram of a second signaling according to another embodiment of the present disclosure, as shown in FIG. 11. In FIG. 11, the second signaling comprises K1 sub-signalings, and the K1 sub-signalings respectively correspond to sub-signaling #1 to sub-signaling #K1 in the figure; the K1 sub-signalings respectively comprise configuration information set(s) of the first-type channel in K1 candidate formats. The K1 sub-signalings in FIG. 10 respectively correspond to PSFCH-format 0 to PSFCH-format (K1-1); the figure also shows an example of IEs comprised in one of the K1 sub-signalings, as shown in the figure, information carried by the sub-signaling comprises at least one of the following:

nrofSymbols, indicating a number of multicarrier symbol(s) occupied by a first-type channel in a slot;

PSFCHPattern, indicating a pattern of a first-type channel in a slot;

startingSymbolIndex, indicating a location of a first multicarrier symbol occupied by a first-type channel in a slot;

nrofPRB, indicating a number of PRB(s) occupied by a first-type channel;

PRBPattern, indicating a pattern of PRB(s) occupied by a first-type channel in frequency domain.

In one embodiment, the K1 sub-signalings are respectively used to determine K1 time-frequency resource pools allocated to the first-type channel.

In one embodiment, the K1 indexes are respectively associated with K1 time-frequency resource pools allocated to the second-type channel.

Embodiment 12

Figure 12:
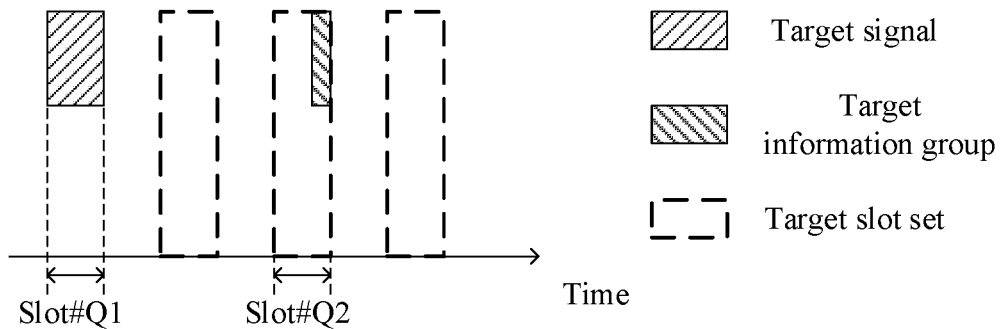
FIG. 12 illustrates a schematic diagram of a target signal and a target information group according to one embodiment of the present disclosure.

Embodiment 12 illustrates a schematic diagram of a target signal and a target information group according to one embodiment of the present disclosure, as shown in FIG. 12. In FIG. 12, a slot occupied by the target signal is slot #Q1, a slot occupied by the target information group is slot #Q2, and a time interval between the slot #Q2 and the slot #Q1 is not less than a first threshold; Q1 and Q2 are positive integers, Q2 is greater than Q1, and the first threshold is equal to at least one millisecond; the slot #Q2 is a slot in a target time slot set.

In one embodiment, a format of the first-type channel carrying the target information group is used to determine the target slot set.

In one embodiment, a frequency bandwidth corresponding to the target signal is used to determine the target slot set.

In one embodiment, a second parameter of the target information group is used to determine the target slot set.

Embodiment 13

Figure 13:
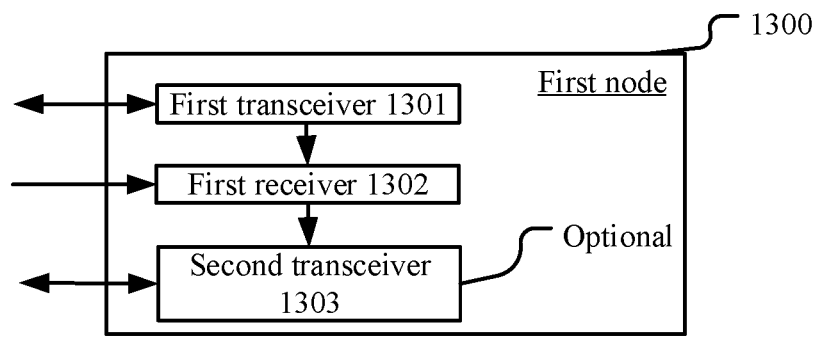
FIG. 13 illustrates a structure block diagram in a first node according to one embodiment of the present disclosure.

Embodiment 13 illustrates a structure block diagram in a first node, as shown in FIG. 13. In FIG. 13, a first node 1300 comprises a first transceiver 1301, a first receiver 1302 and a second transceiver 1303, where the second transceiver 1303 is optional.

The first transceiver 1301 receives a first signaling;

the first receiver 1302 receives a second radio signal in a first time-frequency resource set; and the second transceiver 1303 receives a target signal and transmits a target information group;

In embodiment 13, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling; the first signal is used to request a configuration information set of the first-type channel, and the configuration information set comprises the format of the first-type channel; a channel carrying the target signal is the second-type channel, and a channel carrying the target information group is the first-type channel; the target information group is used to determine whether the target signal is correctly received; a frequency bandwidth corresponding to the target signal is used to determine a format of the first-type channel carrying the target information group, or a second parameter of the target information group is used to determine a format of the first-type channel carrying the target information group.

In one embodiment, the frequency bandwidth corresponding to the second-type channel is a second frequency bandwidth, the second frequency bandwidth is one of K1 candidate frequency bandwidths, and the K1 candidate frequency bandwidths are respectively associated with K1 candidate formats; the format of the first-type channel is one of the K1 candidate formats associated with the second frequency bandwidth.

In one embodiment, the first parameter is a configuration of the first-type channel in time domain, a configuration of the first-type channel in time domain is a first configuration, the first configuration is one of K1 candidate configurations, and the K1 candidate configurations are respectively associated with K1 candidate formats; the format of the first-type channel is one of K1 candidate formats associated with the first configuration.

In one embodiment, the first parameter is a number of multicarrier symbol(s) occupied by the first-type channel in a slot, and the number of the multicarrier symbol(s) occupied by the first-type channel in a slot is used to determine a format adopted by the first-type channel.

In one embodiment, the first parameter is related to a number of information bit(s) carried by the first-type channel, and the number of information bit(s) carried by the first-type channel is used to determine a format adopted by the first-type signal.

In one embodiment, the first parameter is a frequency bandwidth occupied by the first-type channel, and the frequency bandwidth occupied by the first-type channel is used to determine a format adopted by the first-type signal.

In one embodiment, the first transceiver 1301 transmits a first signal; the first signal is used to request a configuration information set of the first-type channel, and the configuration information set comprises the format of the first-type channel.

In one embodiment, the first signaling is used to indicate time-domain resources occupied by the second signaling.

In one embodiment, the second signaling indicates K1 candidate time-frequency resource pools, and the K1 candidate time-frequency resource pools are respectively associated with the K1 candidate formats; the first-type channel is transmitted in a first time-frequency resource pool of the K1 candidate time-frequency resource pools, and the format of the first-type channel is one of the K1 candidate formats associated with the first time-frequency resource pool.

In one embodiment, the first transceiver 13001 comprises at least first six of the antenna 452, the transmitter/receiver 454, the multi-antenna transmitter 457, the transmitting processor 468, the multi-antenna receiving processor 458, the receiving processor 456 and the controller/processor 459 in Embodiment 4.

In one embodiment, the first receiver 1302 comprises at least first four of the antenna 452, the receiver 454, the multi-antenna receiving processor 458, the receiving processor 456 and the controller/processor 459 in Embodiment 4.

In one embodiment, the second transceiver 1303 comprises at least first six of the antenna 452, the transmitter/receiver 454, the multi-antenna transmitter 457, the transmitting processor 468, the multi-antenna receiving processor 458, the receiving processor 456 and the controller/processor 459 in Embodiment 4.

Embodiment 14

Figure 14:
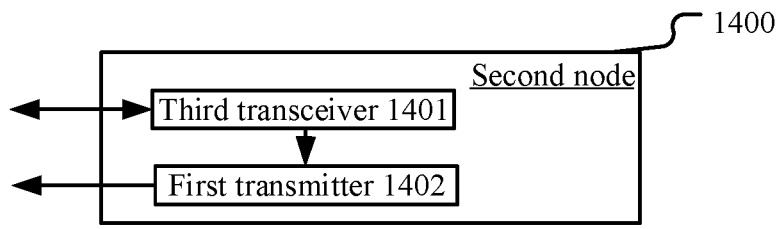
FIG. 14 illustrates a structure block diagram in a second node according to one embodiment of the present disclosure.

Embodiment 14 illustrates a structure block diagram of in a second node, as shown in FIG. 14. In FIG. 14, a second node 1400 comprises a third transceiver 1401 and a first transmitter 1402.

The third transceiver 1401 transmits a first signaling; and
the first transmitter 1402 transmits a second signaling a first time-frequency resource set;

In embodiment 14, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling.

In one embodiment, the frequency bandwidth corresponding to the second-type channel is a second frequency bandwidth, the second frequency bandwidth is one of K1 candidate frequency bandwidths, and the K1 candidate frequency bandwidths are respectively associated with K1 candidate formats; the format of the first-type channel is one of the K1 candidate formats associated with the second frequency bandwidth.

In one embodiment, the first parameter is a configuration of the first-type channel in time domain, a configuration of the first-type channel in time domain is a first configuration, the first configuration is one of K1 candidate configurations, and the K1 candidate configurations are respectively associated with K1 candidate formats; the format of the first-type channel is one of K1 candidate formats associated with the first configuration.

In one embodiment, the first parameter is a number of multicarrier symbol(s) occupied by the first-type channel in a slot, and the number of the multicarrier symbol(s) occupied by the first-type channel in a slot is used to determine a format adopted by the first-type channel.

In one embodiment, the first parameter is related to a number of information bit(s) carried by the first-type channel, and the number of information bit(s) carried by the first-type channel is used to determine a format adopted by the first-type signal.

In one embodiment, the first parameter is a frequency bandwidth occupied by the first-type channel, and the frequency bandwidth occupied by the first-type channel is used to determine a format adopted by the first-type signal.

In one embodiment, the third transceiver 1401 receives a first signal; the first signal is used to request a configuration information set of the first-type channel, and the configuration information set comprises the format of the first-type channel.

In one embodiment, the first signaling is used to indicate time-domain resources occupied by the second signaling.

In one embodiment, the second signaling indicates K1 candidate time-frequency resource pools, and the K1 candidate time-frequency resource pools are respectively associated with the K1 candidate formats; the first-type channel is transmitted in a first time-frequency resource pool of the K1 candidate time-frequency resource pools, and the format of the first-type channel is one of the K1 candidate formats associated with the first time-frequency resource pool.

In one embodiment, the third transceiver 1401 comprises at least first sixth of the antenna 420, the receiver/transmitter 418, the multi-antenna receiving processor 472, the receiving processor 470, the multi-antenna transmitting processor 471, the transmitting processor 416, and the controller/processor 475 in embodiment 4.

In one embodiment, the first transmitter 1402 comprises at least first four of the antenna 420, the transmitter 418, the multi-antenna transmitting processor 471, the transmitting processor 416 and the controller/processor 475 in Embodiment 4.

Embodiment 15

Figure 15:
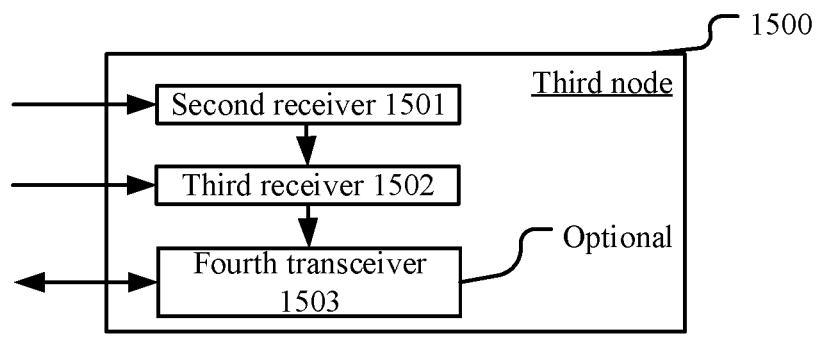
FIG. 15 illustrates a structure block diagram in a third node according to one embodiment of the present disclosure.

Embodiment 15 illustrates a structure block diagram of a third node, as shown in FIG. 15. In FIG. 15, a third node 1500 comprises a third transmitter 1501, a third receiver 1502 and a fourth transceiver 1503, where the fourth transceiver 1503 is optional.

The second receiver 1501 receives a first signaling;

the third receiver 1502 receives a second signaling in a first time-frequency resource set; and the fourth transceiver 1503 transmits a target signal and receives a target information group;

In embodiment 15, the first signaling is used to indicate the first time-frequency resource set, and the second signaling occupies the first time-frequency resource set; the second signaling is used to configure a format of a first-type channel, the format of the first-type channel is related to a frequency bandwidth corresponding to a second-type channel associated with the first-type channel, or the format of the first-type channel is related to a first parameter of the first-type channel; the first signaling is a physical layer signaling; a channel carrying the target signal is the second-type channel, and a channel carrying the target information group is the first-type channel; the target information group is used to determine whether the target signal is correctly received; a frequency bandwidth corresponding to the target signal is used to determine a format of the first-type channel carrying the target information group, or a second parameter of the target information group is used to determine a format of the first-type channel carrying the target information group.

In one embodiment, the frequency bandwidth corresponding to the second-type channel is a second frequency bandwidth, the second frequency bandwidth is one of K1 candidate frequency bandwidths, and the K1 candidate frequency bandwidths are respectively associated with K1 candidate formats; the format of the first-type channel is one of the K1 candidate formats associated with the second frequency bandwidth.

In one embodiment, the above method is characterized in that the first parameter is a configuration of the first-type channel in time domain, a configuration of the first-type channel in time domain is a first configuration, the first configuration is one of K1 candidate configurations, and the K1 candidate configurations are respectively associated with K1 candidate formats; the format of the first-type channel is one of K1 candidate formats associated with the first configuration.

In one embodiment, the above method is characterized in that the first parameter is a number of multicarrier symbol(s) occupied by the first-type channel in a slot, and the number of the multicarrier symbol(s) occupied by the first-type channel in a slot is used to determine a format adopted by the first-type channel.

In one embodiment, the above method is characterized in that the first parameter is related to a number of information bit(s) carried by the first-type channel, and the number of information bit(s) carried by the first-type channel is used to determine a format adopted by the first-type signal.

In one embodiment, the above method is characterized in that the first parameter is a frequency bandwidth occupied by the first-type channel, and the frequency bandwidth occupied by the first-type channel is used to determine a format adopted by the first-type signal.

In one embodiment, the above method is characterized in that the first signaling is used to indicate time-domain resources occupied by the second signaling.

In one embodiment, the above method is characterized in that the second signaling indicates K1 candidate time-frequency resource pools, and the K1 candidate time-frequency resource pools are respectively associated with the K1 candidate formats; the first-type channel is transmitted in a first time-frequency resource pool of the K1 candidate time-frequency resource pools, and the format of the first-type channel is one of the K1 candidate formats associated with the first time-frequency resource pool.

In one embodiment, the second receiver 1501 comprises at least the first four of the antenna 420, the receiver 418, the multi-antenna receiving processor 472, the receiving processor 470 and the controller/processor 475 in embodiment 4.

In one embodiment, the third receiver 1502 comprises at least the first four of the antenna 420, the receiver 418, the multi-antenna receiving processor 472, the receiving processor 470 and the controller/processor 475 in embodiment 4.

In one embodiment, the fourth transceiver 1401 comprises at least first sixth of the antenna 420, the receiver/transmitter 418, the multi-antenna receiving processor 472, the receiving processor 470, the multi-antenna transmitting processor 471, the transmitting processor 416, and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node and the second node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The base station in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations, RSUs and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first transceiver configured to receive a first signaling, the first signaling being a physical layer signaling used to indicate a first time-frequency resource set;
a first receiver configured to receive a second signaling that occupies the first time-frequency resource set; and
a second transceiver configured to receive a target signal in a second-type channel and to transmit a target information group in a first-type channel;
a format of the first-type channel carrying the target information group is configured according to the second signaling and (i) a frequency bandwidth of the target signal or (ii) a second parameter of the target information group,
the format of the first-type channel is that one of a plurality of candidate formats, each having a respective associated candidate frequency bandwidth, associated with a frequency bandwidth corresponding to the second-type channel; and
the target information group is used to determine whether the target signal is correctly received.

2. The first node according to claim 1, wherein the format of the first-type channel is one of a plurality of candidate formats associated with a first configuration of the first-type channel, the first configuration being a configuration in a time domain.

3. The first node according to claim 1, wherein a number of multicarrier symbol(s) occupied by the first-type channel in a slot is used to determine the format of the first-type channel.

4. The first node according to claim 1, wherein the first transceiver transmits a first signal used to request a configuration information set of the first-type channel, and the configuration information set comprises the format of the first-type channel.

5. The first node according to claim 1, wherein the first signaling is used to indicate time-domain resources occupied by the second signaling.

6. The first node according to claim 1, wherein:
the second signaling indicates a plurality of candidate time-frequency resource pools, and the plurality of candidate time-frequency resource pools are respectively associated with the plurality of candidate formats; and
the first-type channel is transmitted in a first time-frequency resource pool of the plurality of candidate time-frequency resource pools, and the format of the first-type channel is one of the plurality of candidate formats associated with the first time-frequency resource pool.

7. The first node according to claim 1, wherein:
the format of the first-type channel is one of candidate formats, and is a positive integer not less than 2; and
the K1 candidate formats at least comprise a first candidate format and a second candidate format, a first-type channel corresponding to the first candidate format is generated through sequence, and a first-type channel corresponding to the second candidate format is generated through coding.

8. The first node according to claim 7, wherein the K1 candidate formats at least comprise a third candidate format, and a first-type channel corresponding to the third candidate format is repeatedly transmitted.

9. The first node according to claim 1, wherein a number of information bit(s) carried by the first-type channel is used to determine the format of the first-type signal.

10. The first node according to claim 1, wherein a frequency bandwidth occupied by the first-type channel is used to determine the format adopted by the first-type signal.

11. The first node according to claim 1, wherein the second signaling comprises a plurality of sub-signalings, and the plurality of sub-signalings respectively comprise configuration information sets of the first-type channel in the plurality of candidate formats.

12. A method in a first node for wireless communications, comprising:
receiving a first signaling, the first signaling being a physical layer signaling used to indicate a first time-frequency resource set;
receiving a second signaling that occupies the first time-frequency resource set; and
receiving a target signal in a second-type channel and transmitting a target information group in a first-type channel
wherein:
the second signaling and (i) a frequency bandwidth of the target signal, or (ii) a second parameter of the target information group is used to configure a format of a first-type channel, the format of the first-type channel is that one of a plurality of candidate formats, each having a respective associated candidate frequency bandwidth, associated with a frequency bandwidth corresponding to the second-type channel; and
the target information group is used to determine whether the target signal is correctly received.

* * * * *